US006504556B1

(12) United States Patent
Myers

(10) Patent No.: US 6,504,556 B1
(45) Date of Patent: Jan. 7, 2003

(54) OPERATOR NOTATION TOOL TIP

(75) Inventor: Thomas A. Myers, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/342,373

(22) Filed: Jun. 29, 1999

(51) Int. Cl.[7] .............................................. G09G 5/00
(52) U.S. Cl. ...................... 345/839; 345/965; 345/773; 345/769; 345/835
(58) Field of Search ............................... 358/1.13, 1.12, 358/1.1; 345/771, 965, 839, 773, 769, 711, 835

(56) References Cited

U.S. PATENT DOCUMENTS

| | | | | |
|---|---|---|---|---|
| 5,081,595 A | | 1/1992 | Morena et al. ............. | 395/111 |
| 5,133,048 A | * | 7/1992 | Parsons et al. ............. | 395/111 |
| 5,251,289 A | * | 10/1993 | Fidler et al. ................ | 395/112 |
| 5,383,129 A | | 1/1995 | Farrell .................... | 364/464.01 |
| 5,748,927 A | * | 5/1998 | Stein et al. ................. | 395/333 |
| 5,835,820 A | | 11/1998 | Martin et al. ................ | 399/85 |
| 5,923,325 A | * | 7/1999 | Barber et al. ............... | 345/336 |
| 6,049,391 A | * | 4/2000 | Farrell ........................ | 358/1.15 |
| 6,078,323 A | * | 6/2000 | Gest ............................ | 345/348 |

* cited by examiner

*Primary Examiner*—Kristine Kincaid
*Assistant Examiner*—Mylinh T Tran
(74) *Attorney, Agent, or Firm*—Paul F. Doebler; Joseph M. Young

(57) ABSTRACT

A user interface with an operator tool tip for navigating and controlling a printing system to generate documents received from one or more input units such as, for example, a computer network, scanner, or modem. Since the operator or user wishes to offer a wide variety of printing options to customers and complete customer orders as quickly as possible, minimizing the interruption of print jobs is a very important priority. By replenishing supplies such as stock and toner in a timely fashion, the use of the printing systems can be maximized. To enable the operator to more efficiently use the printing system to perform a large number of print jobs with as few interruptions as possible, the present invention provides a user friendly tool, which can provide the operator with information regarding the amount of printing supplies currently available in the printing system.

4 Claims, 9 Drawing Sheets

OPERATOR NOTATION TOOL TIP

Attention is directed to applications, U.S. patent application Ser. No. 09/342,949, filed Jun. 29, 1999, entitled, "RESOURCE MANAGEMENT VIA JOB TICKET" and U.S. patent application Ser. No. 09/342,713, filed Jun. 29, 1999, entitled USER INTERFACE FOR NAVIGATION AND CONTROL OF A PRINTING SYSTEM". The disclosures of these applications are hereby incorporated by reference in their entirety.

FIELD OF THE INVENTION

The present invention relates to a printing system, and more particularly to a user interface having an operator notation tool tip for navigating and controlling a printing system to generate documents received from one or more input units including a computer network, scanner, modem, etc.

BACKGROUND OF THE INVENTION

Present and future high capacity printing systems are intended to provide an operator or user with as many job programming options and selections as reasonably possible. Further, operators wish to choose from a very large variety of stock. Stock is the print media or support material on which prints are made. The number of print media choices is very large considering the great number of different sheet sizes, colors, and types that are used by customers today. The number is even larger due to the printing needs of different foreign countries.

Since the operator or user wishes to offer a wide variety of printing options to customers and complete customer orders as quickly as possible, minimizing the interruption of print jobs is a very important priority. By replenishing supplies such as stock and toner in a timely fashion, the utilization of high capacity printing systems can be maximized.

A large amount of information concerning the status of the current print job and the requirements of requested print jobs, which have not yet been performed, is required to maximize the utilization of the printing system. In order for the operator to more efficiently utilize the printing system to perform a large number of print jobs with as few interruptions as possible, there is a need for a user friendly tool which can provide the operator with information regarding the printing supplies available for completing print jobs. Further, there is a need for a user friendly tool which permits operators to create their own tool to identify certain supplies, which are repeatedly used for print jobs, which may or may not have been listed by the manufacturer in a stock library of the user interface.

SUMMARY OF THE INVENTION

According to one embodiment of the present invention, a graphical user interface provides stock profiles to be used by a printing system on a display screen comprising a depiction of a stock library including stock icons on the display screen, a cursor highlighting stock icons, and an operator notation tool tip identifying stocks in the stock library when stock icons are highlighted. A graphical user interface for associating a tray with stock from the stock library displayed on a display screen comprising a depiction of a printing system shown on the display screen including at least one tray icon, a depiction of a pathway access window including a stock library icon, a depiction of a stock library including stock icons on the display screen, an operator notation tool tip identifying stocks in the stock library when stock icons are highlighted, and means for dragging one of the stock icons into the one tray icon to associate the one stock with the one tray.

A printing system for printing image data received from a computer network, scanner or other image data generating device on a support material, comprising: a supply unit having a plurality of feeders, wherein each feeder has at least one tray for storing support material; a controller including a system controller processing the received image data, and a user interface comprising: a depiction of a stock library including stock icons on the display screen, a cursor highlighting stock icons, and an operator notation tool tip identifying stocks in the stock library when stock icons are highlighted; a print engine including a charging unit charging a surface of a photoconductive belt, at least one exposure unit exposing a photoconductive belt to create an electrostatic latent image based on the received image data at the direction of the system controller, at least one developer unit having charged toner particles, which are attracted to the electrostatic latent image, a transfer unit receiving support material and transferring the toner from the photoreceptor belt to the support material, a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

A method for associating a tray in a printing system with a stock, comprising the steps of: accessing a stock library, searching the stock library for the stock, creating a new stock profile and an operator tool tip associated with the stock profile when the search is unsuccessful, and associating the new stock profile with the tray in the printing system.

DETAILED DESCRIPTION OF THE PRESENT INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

Figure 1:
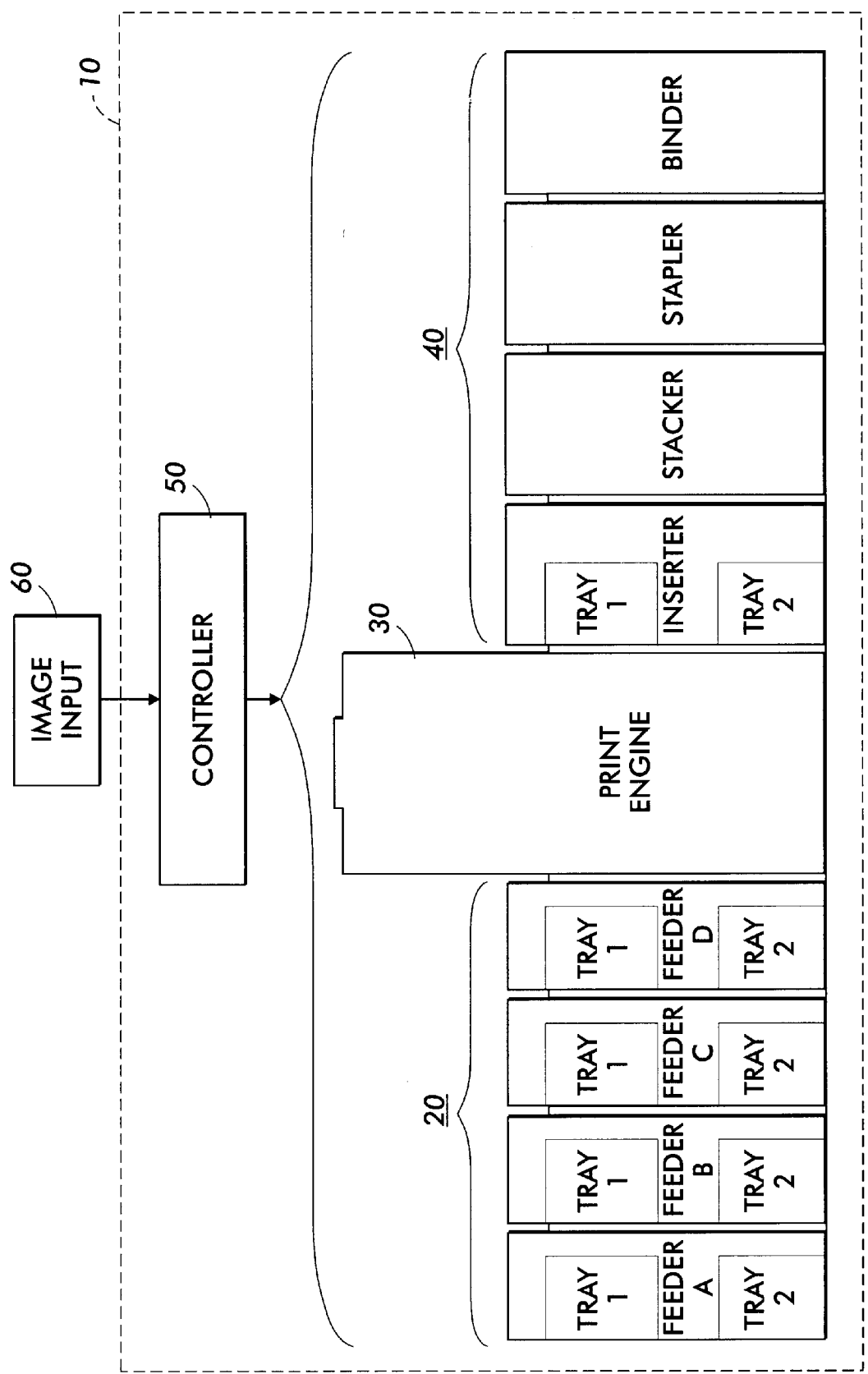
FIG. 1 shows a digital printing system into which the preferred embodiments may be incorporated.

FIG. 1 shows a digital printing system 10 of the type suitable for use with the preferred embodiment for processing print jobs. As shown, the digital printing system includes document feeders 20, a print engine 30, finishers 40 and controller 50. The digital printing system 10 is coupled to an image input section 60.

Figure 2:
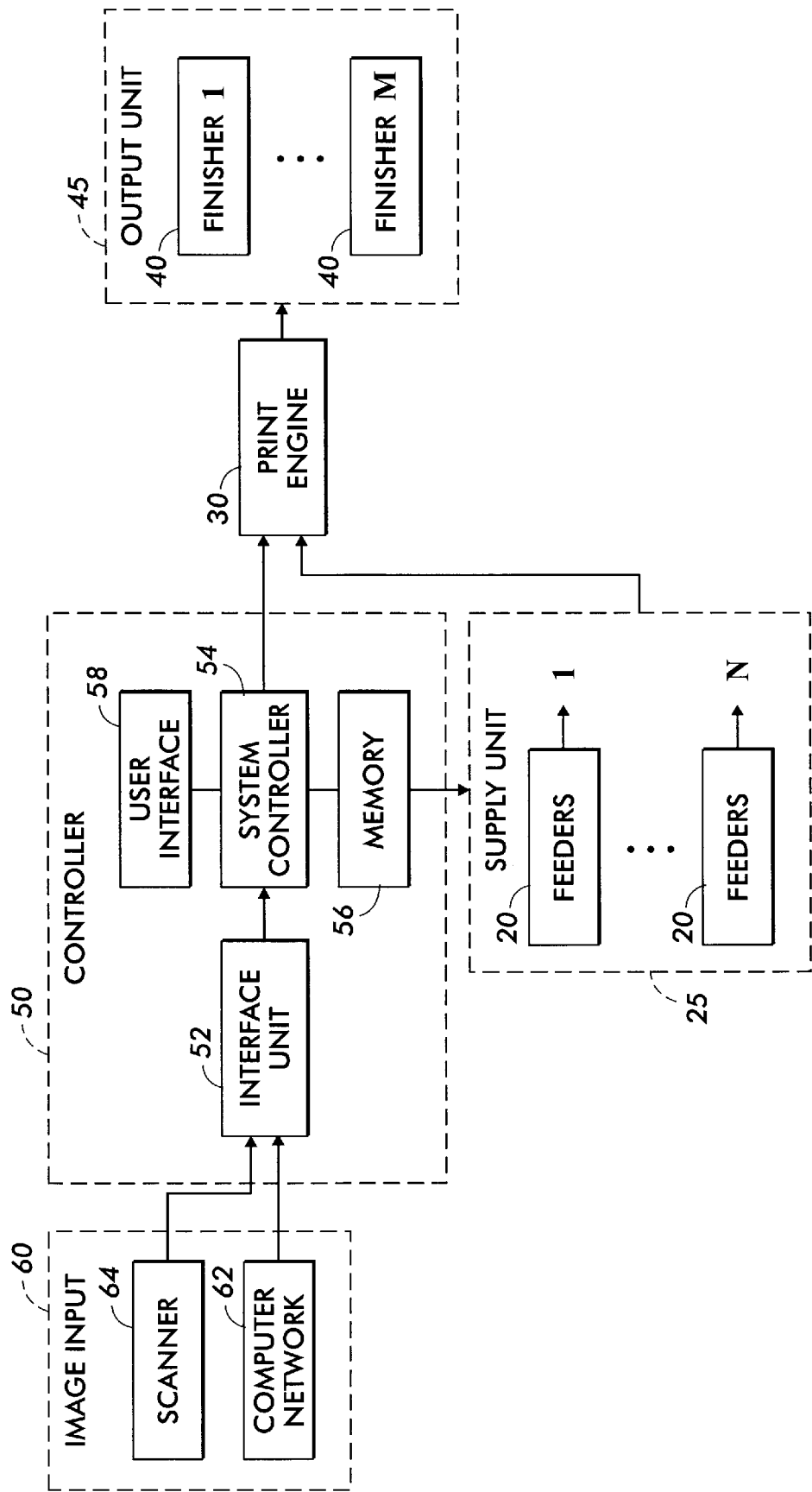
FIG. 2 is a general block diagram of the printing system shown in FIG. 1.

As shown in FIG. 2, the image input section 60 transmits signals to the controller 50. In the example shown, image input section 60 has both remote and onsite image inputs, enabling the digital printing system 10 to provide network, scan and print services. In this example, the remote image input is a computer network 62, and the onsite image input is a scanner 64. However, the digital printing system 10 can be coupled to multiple networks or scanning units, remotely or onsite. Other systems can be envisioned such as stand alone digital printing system with on-site image input, controller and printer. While a specific digital printing system is shown and described, the present invention may be used with other types of printing systems such as analog printing systems.

The digital printing system 10 receives image data, which can include pixels, in the form of digital image signals for processing from the computer network 62 by way of a suitable communication channel, such as a telephone line, computer cable, ISDN line, etc. Typically, computer networks 62 include clients who generate jobs, wherein each job includes the image data in the form of a plurality of electronic pages and a set of processing instructions. In turn, each job is converted into a representation written in a page description language (PDL) such as PostScript® containing the image data. Where the PDL of the incoming image data is different from the PDL used by the digital printing system, a suitable conversion unit converts the incoming PDL to the PDL used by the digital printing system. The suitable conversion unit may be located in an interface unit 52 in the controller 50. Other remote sources of image data such as a floppy disk, hard disk, storage medium, scanner, etc. may be envisioned.

For on-site image input, an operator may use the scanner 64 to scan documents, which provides digital image signals including pixels to the interface unit 52. Whether digital image signals are received from scanner 64 or computer network 62, the interface unit 52 processes the digital image signals into digital image data in a form required to carry out each programmed job. The interface unit 52 is preferably part of the digital printing system 10. However, the computer network 62 or the scanner 64 may share the function of converting the digital image signals into digital image data in the form, which can be unutilized by the digital printing system 10.

As indicated previously, the digital printing system 10 includes one or more (1 to N) feeders 20, a print engine 30, one or more (1 to M) finishers 40 and controller 50. Each feeder 20 preferably includes one or more trays, which forward different types of support material to the print engine 30. All of the feeders 20 in the digital printing system 10 are collectively referred to as a supply unit 25. All of the finishers 40 are collectively referred to as an output unit 45. The output unit 45 may comprise several types of finishers 40 such as inserters, stackers, staplers, binders, etc., which take the completed pages from the print engine 30 and use them to provide a finished product.

Figure 3:
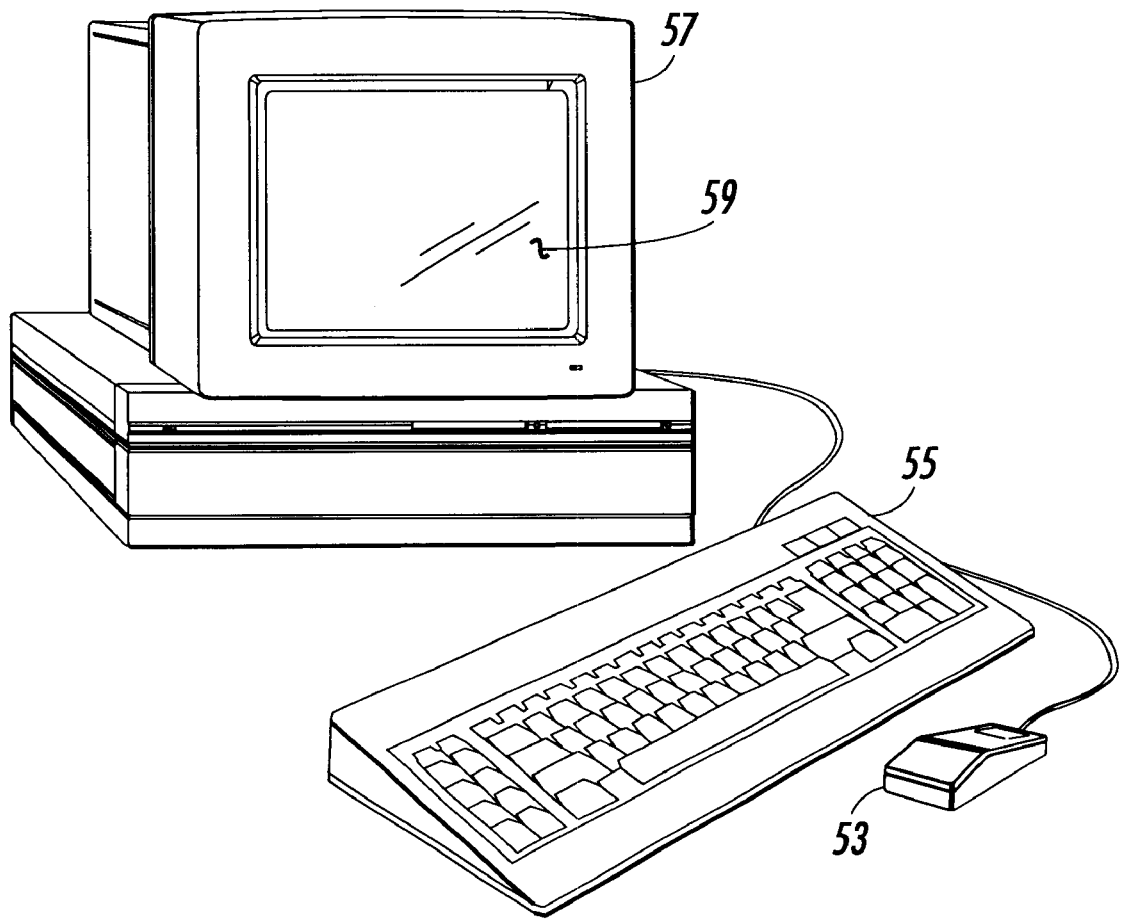
FIG. 3 is a general diagram of a few of the components of the user interface shown in FIG. 2.

The controller 50 controls and monitors the entire digital printing system 10 and interfaces with both on-site and remote input units in the image input section 60. The controller 50 includes the interface unit 52, a system control unit 54, a memory 56 and a user interface 58. The user interface 58 includes an area holding a graphic representation or picture of the feeders 20, print engine 30 and finishers 40 of the digital printing system 10. The user interface 58 permits an operator to monitor the document feeders 20, print engine 30 and finishers 40 by navigating through a series of menus by clicking on a section of the graphical representation of the user interface 58 to reach controls or information related to that component of the digital printing system 10. Therefore, a user (also called an operator) can associate tasks done on the user interface 58 with their physical location on the digital printing system 10 and thereby enable faster and more intuitive navigation. The user interface 58 preferably includes a mouse 53, a keyboard 55 and a display unit 57 having a display screen 59 as shown in FIG. 3.

Figure 4:
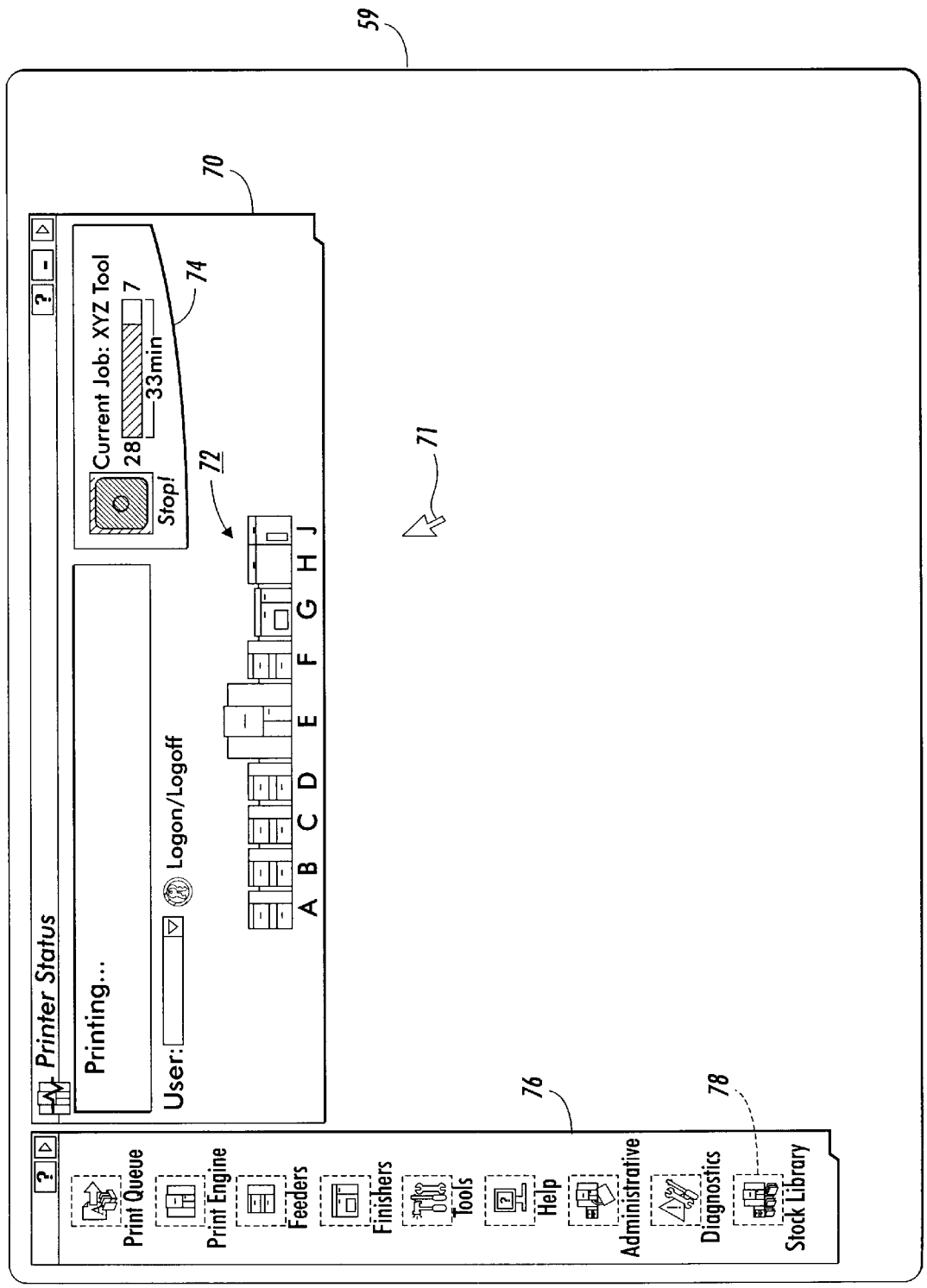
FIG. 4 is a view depicting an exemplary graphical representation of printer status window and pathway access window displayed on a user interface screen of the printing system shown in FIGS. 1 and 2.
Figure 5:
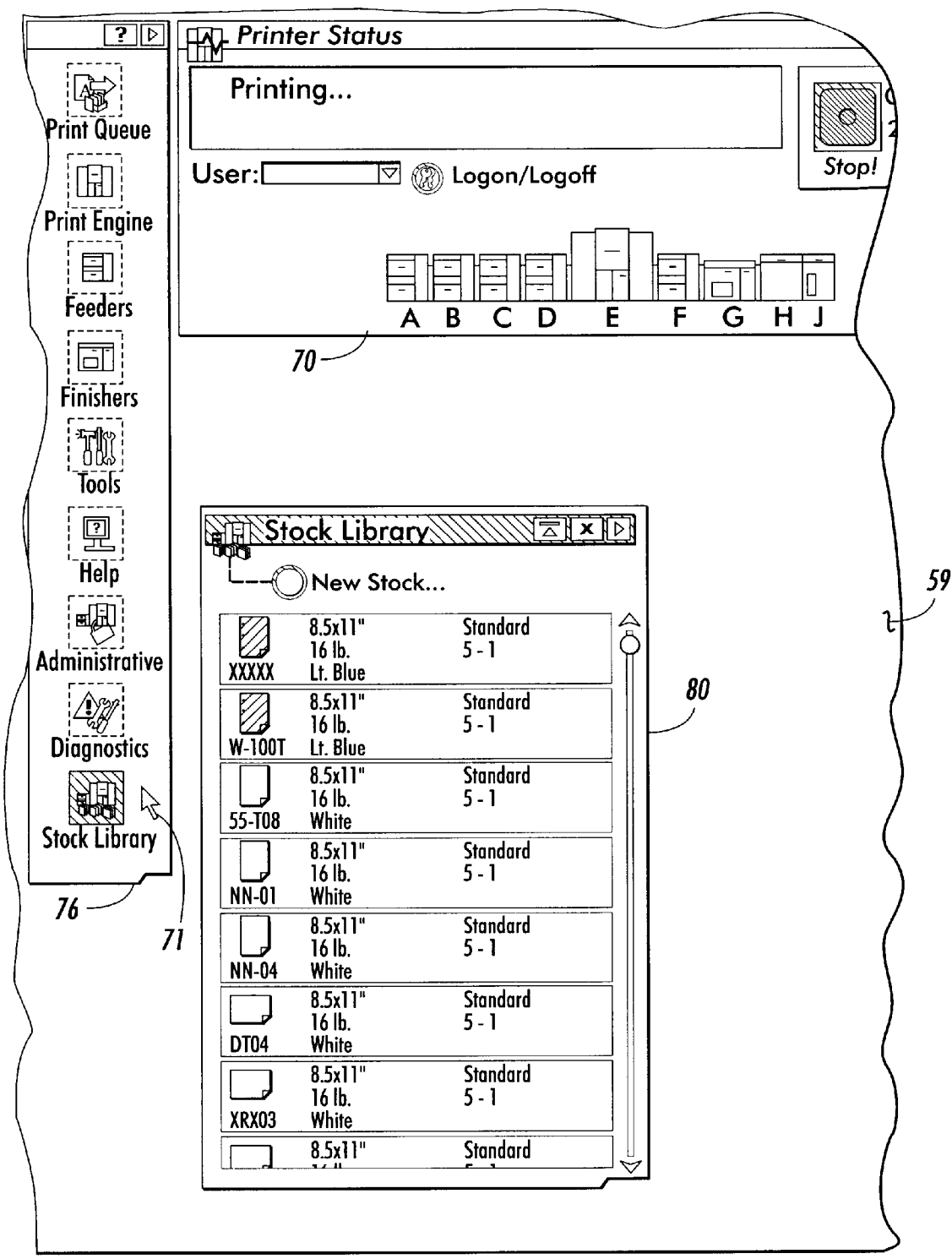
FIG. 5 is a view depicting an exemplary graphical representation of a stock library displayed on a user interface screen of the printing system shown in FIGS. 1 and 2.
Figure 6:
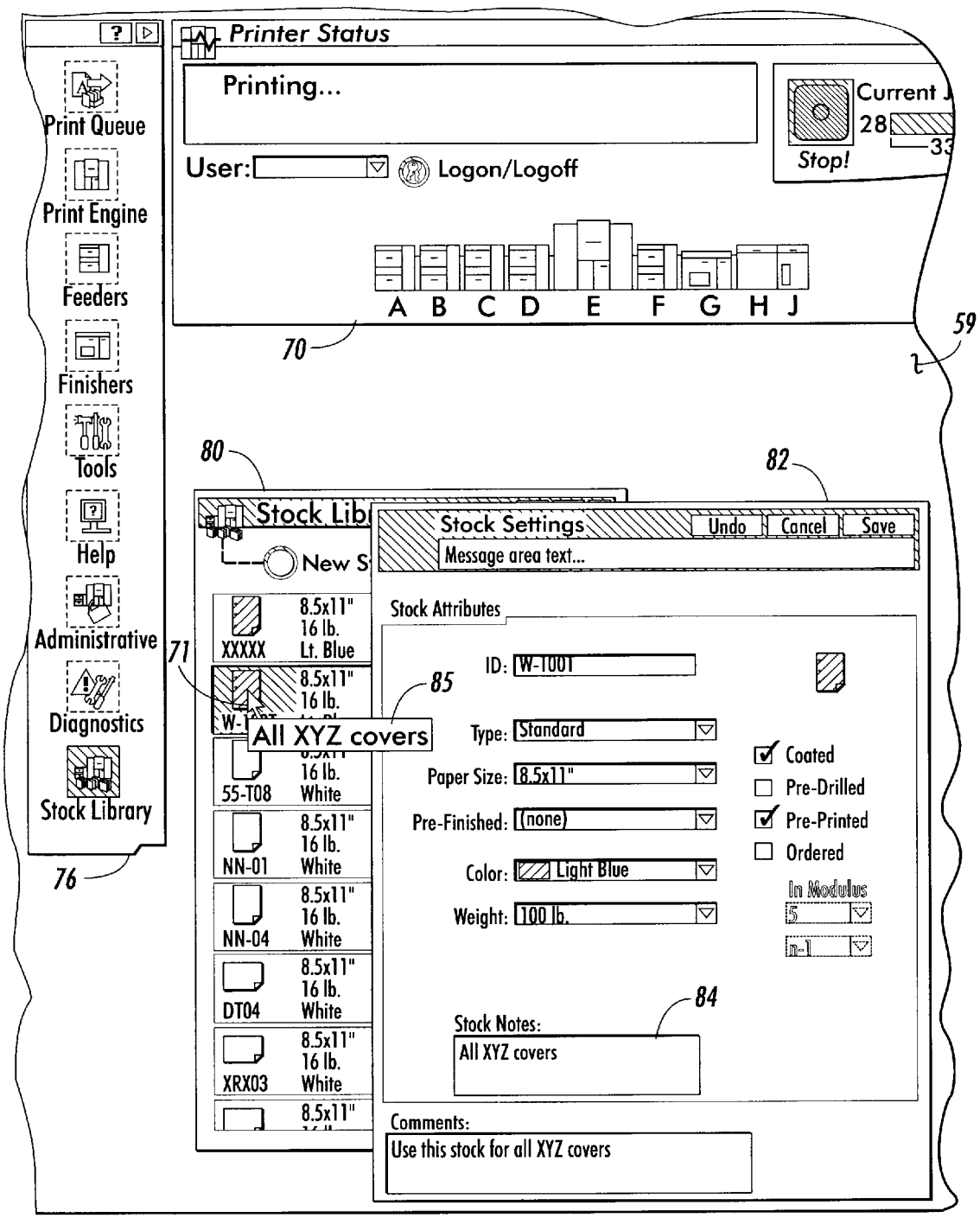
FIG. 6 is a view depicting an exemplary graphical representation of a stock settings and attributes window displayed on a user interface screen of the printing system shown in FIGS. 1 and 2.

FIGS. 4–6 show menus and graphical representations displayed on a display screen 59, and used to reach controls or information related to stock (support materials) in the digital printing system 10. FIG. 4 shows a printer status window 70 having a printer icon 72 including feeder icons A–D, print engine icon E, and finisher icons F–J. However, as indicated above, feeder icons and finisher icons can be added or removed so that the printer icon 72 is an accurate depiction of the printing system actually being used by the operator. A cursor 71 is used to highlight icons on the display screen 59. The printer status window 70 also includes a job progress icon 74, which continuously informs the operator of the total time required to complete a print job (e.g. 33 minutes), the time that has elapsed since the print job began (e.g. 28 minutes) and the time remaining (7 minutes). This enables the operator to make choices as to whether to stop or suspend the current job in order to process a higher priority job.

FIG. 4 also shows a pathway access window 76, which also provides access to information and control of the digital printing system 10. By highlighting and clicking on the stock library icon 78 in the pathway access window 76, a stock library 80 as shown in FIG. 5 appears on the display screen 59. By highlighting and clicking on the stock labeled W-100T, the stock profile 82 of this particular stock is displayed on the display screen 59 as shown in FIG. 6. The stock profile lists stock attributes, which preferably include color, paper weight, size, coating and preprinting. It is understood that this list of attributes is not exhaustive. Moreover, it is understood highlighting a clicking on an icon is only an example of one way of displaying menus. Double clicking, highlighting, single clicking, etc. can be used alone or in combination to display menus.

Figure 7:
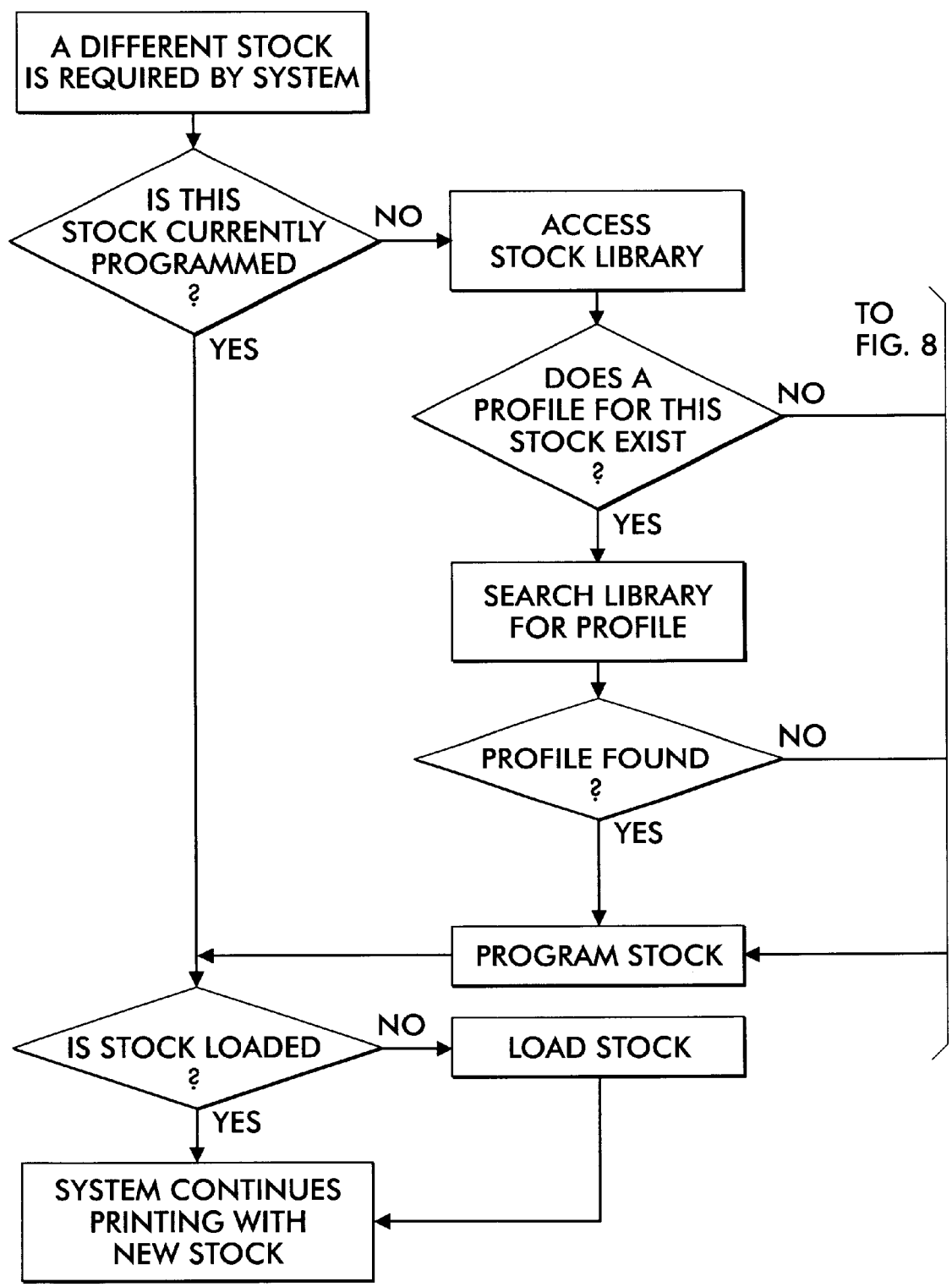
FIG. 7 is a flow chart showing steps for the operator notation tool tip of the user interface of the present invention.
Figure 8:
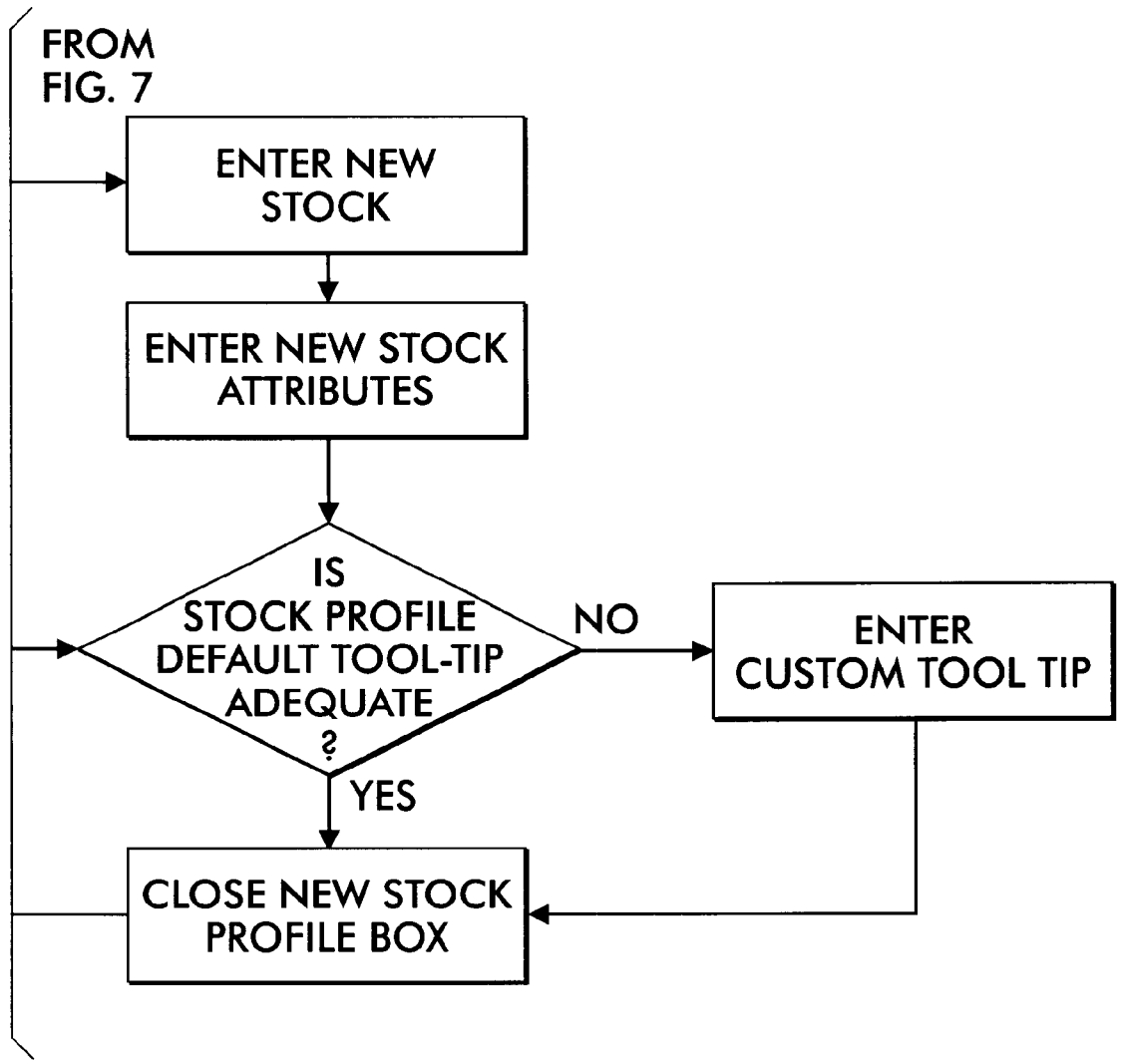
FIG. 8 is a flow chart showing further steps for the operator notation tool tip of the user interface of the present invention.

As indicated above, there is a need for an operator notation tool tip, so that the operator can reference stock using his or her own system rather than relying only on the stock identification system provided by the manufacturer (default system). The window 84 provides the operator with the opportunity to enter or change the operator notation tool tip as described below FIGS. 7–8 show the process for creating, modifying or utilizing an operator tool tip for selecting stock for a print job. If a different stock is required by the system, this stock is currently programmed, and loaded in a tray of a feeder 20, the digital printing system 10 continues the print job with this stock. If this stock is not loaded, the operator loads this stock into a tray of a feeder 20 so that the print job can continue. A stock is programmed when the stock is associated with a tray. This is accomplished by dragging the stock icon from the stock library window onto the tray icon.

However, if this stock is not currently programmed, the stock library 80 is accessed to determine if a profile for the stock exists by highlighting the icons in the stock library 80 with the cursor 71 as shown in FIGS. 5 and 6. By highlighting the icons, the operator notation tool tip 85 for each icon is displayed. By clicking on the highlighted icon, the stock profile 82 of the icon is displayed. If the operator finds the appropriate stock profile 82 using this method, the stock is programmed by associating the stock with a tray. If the stock is loaded, the system continues the print job using this stock. However, if the stock is not loaded, the operator loads the stock to continue the print job.

If the stock profile 82 required by the system did not exist, was not found in the stock library 80 or was difficult to find in the stock library 80, the operator tool tip 85 can be changed by the operator. For example, if the stock profile 82 did not exist, then the operator could enter a new stock profile by entering new stock attributes. By entering text, symbols, etc. into the window 84 below the "Stock Notes" in FIG. 6, a custom operator tool tip is established for that stock. In a second example, if the stock was provided by the manufacturer and the default tool-tip provided by the manufacturer is not adequate, then the operator could enter a new operator tool tip by editing the window 84 in FIG. 6. On default, the identification number for the stock is repeated as the operator tool tip. Also, if an operator could not find the stock profile 82, because he or she could not recognize the operator tool tip, which he or she had previously entered, the operator can still search through the stock library 80 using other stock attributes. Once, the appropriate stock is found, the window 84 in FIG. 6 can be edited to provide a custom operator tool tip. The tool tip should now be adequate. After the operator tool tip is customized, the stock profile is closed. Then, the operator programs the stock. If the stock is loaded, the system continues the print job using this stock. However, if the stock is not loaded, the operator loads the stock to continue the print job.

Figure 9:
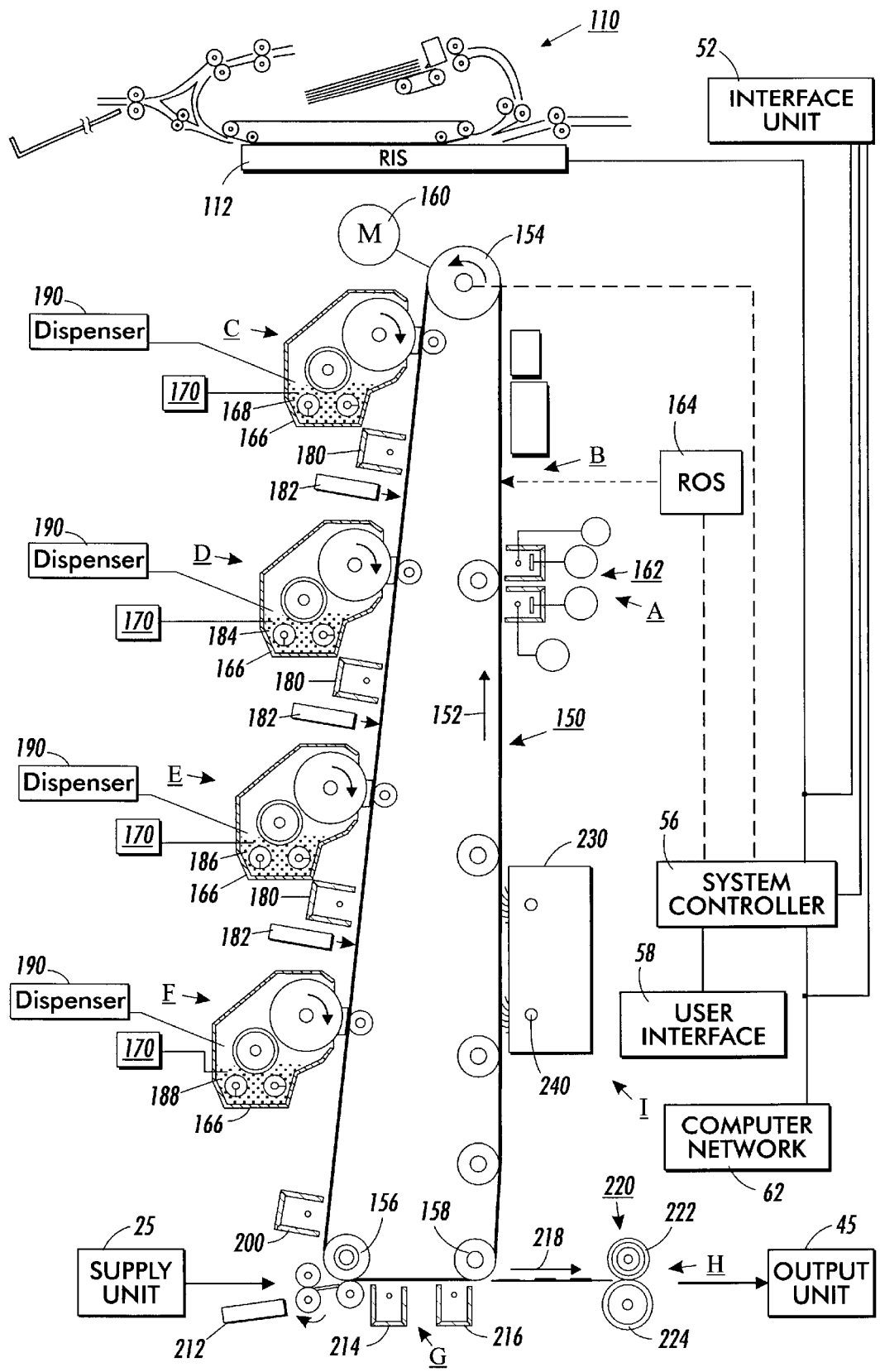
FIG. 9 is a partial schematic elevational view of an example of a printing system employing the operator notation tool tip of the present invention.

FIG. 9 is a partial schematic view of a digital printing system, such as the digital imaging system of U.S. application Ser. No. 09/318,953, utilizing the graphical user interface and operator tool tip of the present invention. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system. The present invention is applicable to a printing system having a print engine with any number of developer housings.

In one embodiment, an original document can be positioned in a document handler 110 on a raster-input scanner (RIS) indicated generally by reference numeral 112. However, as shown in FIG. 2, any scanner 64 can be utilized. The RIS 112 captures the entire original document and converts it to a series of raster scan lines or image signals. This information is transmitted to an electronic subsystem (ESS) or system controller 54 by way of user interface 52. System controller 54 includes a pixel counter, and is connected to a user interface 58. Alternatively, image signals may be supplied by a computer network 62 by way of user interface 52.

The print engine preferably uses a charge retentive surface in the form of an Active Matrix (AMAT) photoreceptor belt 150 supported for movement in the direction indicated by arrow 152, for advancing sequentially through the various xerographic process stations. The photoreceptor belt 150 is entrained about a drive roller 154, tension rollers 156 and fixed roller 158 and the drive roller 154 is operatively connected to a drive motor 160 for effecting movement of the photoreceptor belt 150 through the xerographic stations. A portion of photoreceptor belt 150 passes through charging station A where a corona generating device, indicated generally by the reference numeral 162, charges the photoconductive surface of photoreceptor belt 150 to a relatively high, substantially uniform, preferably negative potential.

Next, the charged portion of photoconductive surface is advanced through an imaging/exposure station B. At imaging/exposure station B, the system controller 54 receives the image signals from raster input scanner 66 by way of the interface unit 52. The image signals represent the desired output image. The system controller 54 processes these signals to convert them to the various color separations of the image which is transmitted to a laser based output scanning device, which causes the charge retentive surface to be discharged in accordance with the output from the scanning device. Preferably the laser based scanning device is a laser Raster Output Scanner (ROS) 164. Alternatively, the ROS 164 could be replaced by other xerographic exposure devices such as LED arrays. A computer network 62 may also transmit image signals to the system controller 54 by way of the interface unit 52.

The photoreceptor belt 150, which is initially charged to a voltage $V_0$, undergoes dark decay to a level equal to about −500 volts. When exposed at the exposure station B, it is discharged to a level equal to about −50 volts. Thus after exposure, the photoreceptor belt 150 contains a monopolar voltage profile of high and low voltages, the former corresponding to charged areas and the latter corresponding to discharged or background areas.

At a first development station C, developer structure, indicated generally by the reference numeral 166 utilizing a hybrid development system, the development roll, better known as the donor roll, is powered by two development fields (potentials across an air gap). The first field is the ac field which is used for toner cloud generation. The second field is the dc development field which is used to control the amount of developed toner mass on the photoreceptor belt 150. Preferably, the developer structure 166 contains magenta toner particles 168. The toner cloud causes charged magenta toner particles 168 to be attracted to the electrostatic latent image. Appropriate developer biasing is accomplished via a power supply. This type of system is a noncontact type in which only toner particles (magenta, for example) are attracted to the latent image and there is no mechanical contact between the photoreceptor belt 150 and a toner delivery device to disturb a previously developed, but unfixed, image. A toner concentration sensor 170 senses the toner concentration in the developer structure 166. A toner dispenser 190 adds new toner particles 168 to increase the toner concentration in the developer structure 166 at developer station C. The developed but unfixed image is then transported past a second charging device 180 where the photoreceptor belt 150 and previously developed toner image areas are recharged to a predetermined level.

A second exposure/imaging is performed by device 182. Device 182 preferably comprises a laser based output structure and is preferably utilized for selectively discharging the photoreceptor belt 150 on toned areas and/or is bare areas, pursuant to the image to be developed with the second color toner. Device 182 may be a raster output scanner or LED window. At this point, the photoreceptor belt 150 contains toned and untoned areas at relatively high voltage levels and toned and untoned areas at relatively low voltage levels. These low voltage areas represent image areas which are developed using discharged area development (DAD). To this end, a negatively charged, developer material 184 comprising color toner, preferably yellow, is employed. The toner, which by way of example may be yellow, is contained in a developer structure 166 disposed at a second developer station D and is presented to the latent images on the photoreceptor belt 150 by way of a second developer system. A power supply (not shown) serves to electrically bias the developer structure 166 to a level effective to develop the discharged image areas with negatively charged yellow toner particles 184. Further, a toner concentration sensor 170 senses the toner concentration in the developer structure 166. A toner dispenser 190 adds new toner particles 184 to increase the concentration in the developer structure 166 at developer station D.

The above procedure is repeated for a third image for a third suitable color toner such as cyan 186 (station E) and for a fourth image and suitable color toner such as black 188 (station F). The exposure control scheme described below may be utilized for these subsequent imaging steps. In this manner a full color composite toner image is developed on the photoreceptor belt 150. In addition, a permeability sensor 200 measures developed mass per unit area. Although only one mass sensor 200 is shown in FIG. 9, there may be more than one mass sensor 200.

To the extent to which some toner charge is totally neutralized, or the polarity reversed, thereby causing the composite image developed on the photoreceptor belt 150 to consist of both positive and negative toner, a negative pre-transfer dicorotron member 214 is provided to condition all of the toner for effective transfer to a substrate using positive corona discharge.

Subsequent to image development a sheet of support material 212 from supply unit 25 is moved into contact with the toner images at transfer station G. The sheet of support material 212 is advanced to transfer station G by the supply unit 25. The sheet of support material 212 is then brought into contact with photoconductive surface of photoreceptor belt 150 in a timed sequence so that the toner powder image developed thereon contacts the advancing sheet of support material 212 at transfer station G.

Transfer station G includes a transfer dicorotron 214 which sprays positive ions onto the backside of support material 212. This attracts the negatively charged toner powder images from the photoreceptor belt 150 to sheet 212. A detack dicorotron 216 is provided for facilitating stripping of the sheets from the photoreceptor belt 150.

After transfer, the sheet of support material 212 continues to move, in the direction of arrow 218, onto a conveyor (not shown) which advances the sheet to fusing station H. Fusing station H includes a fuser assembly, indicated generally by the reference numeral 220, which permanently affixes the transferred powder image to sheet 212. Preferably, fuser assembly 220 comprises a heated fuser roller 222 and a backup or pressure roller 224. Sheet 212 passes between fuser roller 222 and backup roller 224 with the toner powder image contacting fuser roller 222. In this manner, the toner powder images are permanently affixed to sheet 212. After fusing, a chute, not shown, guides the advancing sheets 212 to the output unit 45, which includes one or more finishers 40 such as a catch tray, stacker, binder, stapler or other output device, for subsequent removal from the printing system by the operator.

After the sheet of support material 212 is separated from photoconductive surface of photoreceptor belt 150, the residual toner particles carried by the non-image areas on the photoconductive surface are removed therefrom. These particles are removed at cleaning station 1, preferably using a cleaning brush or plural brush structure contained in a housing 230. The cleaning brush 240 or brushes 240 are engaged after the composite toner image is transferred to a sheet. Once the photoreceptor belt 150 is cleaned the brushes 240 are retracted utilizing a device incorporating a clutch (not shown) so that the next imaging and development cycle can begin.

System controller 54 regulates the various printer functions. The system controller 54 is preferably a programmable controller, which controls printer functions hereinbefore described. The system controller 54 may provide a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by an operator. Conventional sheet path sensors or switches may be utilized to keep track of the position of the document and the copy sheets.

While the Figures show one example of a printing system incorporating the operator tool tip of the present invention, it is understood that this process could be used in any printing system.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A graphical user interface for providing stock profiles to be used by a printing system on a display screen comprising:

a depiction of a stock library including stock icons on the display screen;

a cursor highlighting stock icons; and an operator notation tool tip identifying stocks in the stock library when stock icons are highlighted wherein the operation notation tool tip is a user defined tool tip.

2. A graphical user interface for associating a tray with stock from the stock library displayed on a display screen comprising:

a depiction of a printing system shown on the display screen including at least one tray icon;

a depiction of a pathway access window including a stock library icon;

a depiction of a stock library including stock icons on the display screen;

an operator notation tool tip identifying stocks in the stock library when stock icons are highlighted wherein the operation notation tool tip is a user defined tool tip; and means for dragging one of the stock icons into the one tray icon to associate the one stock with the one tray.

3. A printing system for printing image data received from a computer network, scanner or other image data generating device on a support material, comprising:

a supply unit having a plurality of feeders, wherein each feeder has at least one tray for storing support material;

a controller including:
   a system controller processing the received image data; and
   a user interface comprising:
      a depiction of a stock library including stock icons on the display screen;
      a cursor highlighting stock icons; and
      an operator notation tool tip identifying stocks in the stock library when stock icons are highlighted wherein the operation notation tool tip is a user defined tool tip;
   a print engine including:
      a charging unit charging a surface of a photoconductive belt;
      at least one exposure unit exposing a photoconductive belt to create an electrostatic latent image based on the received image data at the direction of the system controller;
      at least one developer unit having charged toner particles, which are attracted to the electrostatic latent image;
      a transfer unit receiving support material and transferring the toner from the photoreceptor belt to the support material;
      a fuser assembly receiving the support material from the transfer unit and permanently affixing the toner to the sheet of support material; and
      a cleaning unit cleaning the photoreceptor belt; and a finishing unit, coupled to the print engine, the finishing unit comprising at least one of a stacker, binder, stapler and inserter.

4. A method for associating a tray in a printing system with a stock, comprising the steps of:
   accessing a stock library;
   searching the stock library for the stock;
   creating a new stock profile and an operator tool tip associated with the stock profile when the search is unsuccessful; and
   associating the new stock profile with the tray in the printing system.

* * * * *